United States Patent Office

2,837,563
Patented June 3, 1958

2,837,563

WATER SOLUBLE ALBUMIN-PRECIPITATING CONDENSATION PRODUCTS

Richard Alles, Ludwigshafen (Rhine), Germany, assignor to Badische Anilin- & Soda-Fabrik Aktiengesellschaft, Ludwigshafen (Rhine), Germany No Drawing. Application May 23, 1955, Serial No. 510,581. In Germany October 1, 1948

Public Law 619, August 23, 1954
Patent expires October 1, 1968

12 Claims. (Cl. 260—506)

This invention relates to novel water soluble condensation products which are coagulants for proteins and to processes of manufacturing such condensation products. More particularly, it is directed to condensation products of the addition compounds of sulfurous acid or its derivatives to carbonyl compounds, with formaldehyde and a phenol.

Among the principal objects of this invention is the provision of a new process for making new tanning agents which are not hydrolizable. Another object of the invention is the manufacture of condensation products which may be used as such or after a further reaction as pharmaceuticals, disinfectants and preserving agents.

In accordance with this invention, the addition product of sulfurous acid or of a water soluble salt thereof, in particular of a bisulfite, to a carbonyl compound is reacted preferably at elevated temperature with formaldehyde and with a phenol which is free from sulfonic acid groups to produce water soluble condensation products.

The addition products of sulfurous acid or its water-soluble salts may be prepared in known manner by reacting sulfurous acid or its water-soluble salts, in particular its alkali metal or ammonium salts or mixtures of sulfurous acid and sulfites, with carbonyl compounds.

Suitable carbonyl compounds are the enol-forming aldehydes and ketones, preferably the simple unsubstituted mono- and bi-functional compounds such as the alkyl ketones and aldehydes, acetaldehyde, levulinic aldehyde, acetone and acetonyl acetone. Other saturated aliphatic carbonyl compounds may be employed, for example, the hydroxy and carboxy derivatives of these compounds, such as acetoacetic ester, 2-ketobutandiol-1.4, acetone dicarboxylic acid, levulinic acid and pyruvic acid.

For this reaction, the phenol may be phenol itself or a derivative of phenol, such as an alkyl phenol, a polyhydric phenol, a halogenated phenol, a nitrophenol or a carboxylated phenol, for example, salicylic acid, or mixtures of these compounds.

The reaction of the addition compounds of sulfurous acid or its salts to the carbonyl compounds with formaldehyde and a phenol may be effected in various ways. For example, first the alkali-soluble phenol alcohols may be prepared from phenol and formaldehyde in known manner, and then brought to reaction by mixing in alkaline, neutral or weakly acid solution with the addition compounds. Instead of the simple phenol alcohols, more highly condensed phenol resins which are no longer soluble in water may be used. The reaction may also be carried out by adding phenol and formaldehyde to an alkaline solution of the carbonyl addition compound.

The carbonyl compound and the sulfurous acid or the derivatives thereof are used in a molar ratio to one another depending on the number of reactive carbonyl groups. For accelerating the reaction and to ensure a complete conversion of the carbonyl compound, the sulfurous acid or a derivative thereof are efficiently used in a from 10 to 20% excess. The adducts of the carbonyl compound and sulfurous acid are caused to react with such a number of mols of formaldehyde and phenol or the corresponding compound as corresponds to the number of exchangeable hydrogen atoms, i. e. the hydrogen atoms attached to the carbon atom neighbored to the carbinol group and, if aldehydes are used as the starting material, also the hydrogen atom attached to the functional carbon atom. When phenol is condensed with formaldehyde first, the ratio between the two components may be up to 3 mols of formaldehyde to 1 mol of phenol. Larger amounts of formaldehyde will result in resinification.

The reaction proceeds smoothly in the presence of water or an aqueous medium. In the absence of water the formation of undesired products is unavoidable. The reaction is feasibly carried out in closed vessels with reflux cooling. There is no necessity of using completely closed vessels or applying pressure for the reason that temperatures higher than the boiling temperature of the aqueous solution need not be used for the reaction.

Ash-free products may also be obtained by reacting the ammonium bisulfite addition compounds with phenol alcohols and phenol resins if both the phenol alcohols and phenol resins, after their production, have been separated from the salt-containing mother liquor which results in the neutralization.

As a rule, reaction temperatures between 60 and 100° C. should be employed. The temperature range between 80 and 90° C. has been found to be the most advantageous.

By this process, condensation products are obtained containing hydroxyaryl methyl groups attached to the carbon atoms adjacent to the original carbonyl group. For example, by employing the addition compound of sodium bisulfite to acetone as a starting material, condensation products of the general formula

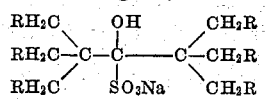

are obtained, and from the bisulfite addition compound of acetonyl acetone, condensation products of the general formula

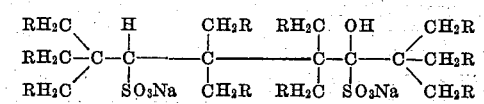

may be obtained. R represents a hydroxyaryl group in each formula. It is however possible also to substitute only part of the hydrogen atoms of the bisulfite addition compounds by hydroxyaryl methyl groups, by employing lesser proportions of phenol and formaldehyde. The new water-soluble condensation products exert strongly albumin-precipitating and powerful tanning actions.

I have further found that these condensation products, containing hydroxyl groups and sulfonic acid groups at the same carbon atom, can be further condensed at elevated temperatures with further organic, preferably aromatic, compounds which contain exchangeable hydrogen atoms and hence are capable of condensing with said carbinol groups with the splitting off of water.

Organic compounds which are capable of condensing with the carbinol groups are, for example, mono- and poly-hydric phenols, hydroxyaryl carboxylic acids, naphthols, aryl sulfonic acids, arylsulfones, sulfonamides, lignin sulfonic acids, diazo compounds, or their functional derivatives and condensation products, and urea or mixtures of these compounds.

Such compounds are for example phenol, cresol, resorcinol, pyrocatechol, salicylic acid, dimethyldiphenylmethane, beta-naphthol, dinaphtholmethane, dihydroxydiphenyl sulfone, urea and sulfonamides.

Condensation products, functional derivatives or substitution products of the said classes of substances may also be used, as for example, hydroxyethylated phenols and naphthols, phenol-sulfur resins and phenol-formaldehyde resins.

For example, with resorcinol, compounds of the following general formula are formed

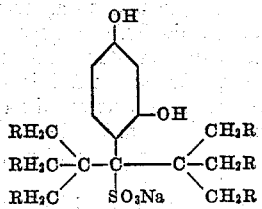

where R represents a hydroxyaryl radical.

Also, therapeutically-active sulfonamide compounds may be condensed, for example, diazotized 4-aminobenzene sulfonamide or its known functional derivatives may be coupled with the carbinols. The carbinols may be reacted with 4-aminobenzene sulfonamide or its known modified compounds, for example 4-(4'-aminobenzenesulfonamido)-benzenesulfonic acid amides and their derivatives. Other useful compounds are obtained by coupling or reaction of the carbinol groups with the $N_1$-heterocyclic substituted aminobenzene sulfonamides, for example with 2-(para-aminobenzene-sulfonamido)-pyridine or with 2-(para-aminobenzene-sulfonamido)-thiazole.

The reaction of the carbinol group takes place more readily with increasing substitution by hydroxyaryl methyl groups of the exchangeable hydrogen atoms of the adjacent carbon atoms. This reaction may be carried out in an aqueous medium having an acid, neutral or alkaline reaction. The reaction temperatures for the second reaction lie between 60 and 100° C.

A new class of substances is provided by the invention, which may be used for a great variety of industrial purposes, as for example, as tanning agents, as initial materials and intermediates for dyestuffs, in particular for polyazo dyestuffs, as substitutes for tannin, and for a great variety of purposes in the textile industries, such as the preserving of wool and the formation of color lakes. Certain of the compounds are disinfecting and preserving agents, or may be used in chemo-therapeutic preparations. These properties result from a high concentration of phenol groups in one molecule and the high molecular weights which are attainable with simultaneous water-solubility. The reaction products are also useful in being capable of undergoing further reactions according to known processes, as for example, coupling with diazo compounds and addition of ethylene oxide.

The new products may be readily salted out and obtained in solid form for example by kneading out the water.

The following examples will further illustrate the invention, but the invention is not restricted to these examples. The parts are by weight unless otherwise specified.

*Example 1*

60 parts of acetone are allowed to flow while stirring and cooling into a solution of 124.8 parts of powdered sodium bisulfite in 100 parts of water. After from 10 to 15 minutes, a mixture of 432 parts of cresol of high purity, 30 parts of caustic soda and 50 parts of water is allowed to flow in. The mixture is then heated to 60° C., 420 parts of 30 percent formaldehyde solution are added while stirring and the mixture is further heated for 25 minutes at from 90° to 93° C. As soon the initially turbid mixture has become clear, the temperature is allowed to fall to 80° C. and the whole is kept at this temperature for 2 hours. Then 55 parts of resorcinol are added and the whole heated again to from 96° to 98° C. This temperature is maintained until a sample of the solution, after dilution with water and acidification with formic acid, gives a completely clear solution; this is the case after from 8 to 10 hours. The product is adjusted to a pH value between 4.3 and 4.6 with glacial acetic acid. It is eminently suitable as a tanning agent for light leather, in particular for tanning sheepskin and goatskin.

*Example 2*

58 parts of acetone are allowed to flow while cooling and stirring into a solution of 104 parts of powdered sodium bisulfite in 230 parts of water.

(a) A mixture of 259.2 parts of cresol of high purity, 150.4 parts of phenol and 10 parts of caustic soda, dissolved in 15 parts of water, is heated, after running in 400 parts of a 30 percent solution of formaldehyde, for 1 hour at 65° C. and for 5 hours at 70° C. while stirring. After cooling to 40° C., 14.4 parts of 85 percent formic acid are added and, after 12 hours, the oily condensation product is separated from the supernatant aqueous liquid.

The acetone-bisulfite solution is then heated to 50° C. and the oily cresolphenol condensation product is allowed to flow in while stirring; the whole is heated to from 90° to 93° C. and the clarification of the initially turbid liquid is watched for; this occurs within 13 to 15 minutes after 90° C. has been reached. Thereupon the whole is heated at 96° C. until a sample withdrawn and diluted with water gives a completely clear solution. This is the case after about 10 hours.

The condensation product adjusted by means of glacial acetic acid to a pH value of 3.4 to 3.5 is especially suitable for the production of light varieties of leather.

(b) Instead of the cresol-phenol mixture 380 parts of phenol can also be used, i. e. 4 mols of phenols to 1 mol of acetone, a product of the formula

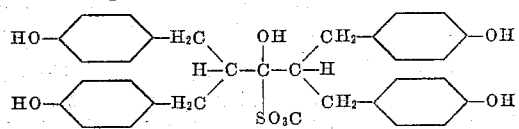

being obtained.

*Example 3*

An acetone-sodium bisulfite solution is prepared as described in Example 2. An oily condensation product is also prepared (as described in Example 2a) from a mixture of cresol and phenol, but it is not separated by the addition of formic acid.

The cresol-phenol-formaldehyde condensation product is allowed to flow while stirring into the solution of the sodium bisulfite-acetone addition compound which has been heated to 50° C., the whole is heated to 80° and kept at this temperature for 7 to 8 hours. It is then cooled to 50° C., 72 parts of beta-naphthol are added, it is heated again to 80° C. and kept at this temperature for 3 hours and then heated for 6 hours at 90° C.

A condensation product which gives a completely clear solution by dilution with water is thus obtained which is precipitated by adding at 50° C. a solution of 125 parts of concentrated hydrochloric acid and 300 parts of water.

The soft resin mass obtained may be dehydrated to a great extent by kneading. The product gives full and soft leather.

When using the starting material described in Example 2b instead of the starting material described in Example 2a and causing it to react with 144 parts of beta-naphthol, i. e. the equivalent amount thereof, a product of the following formula

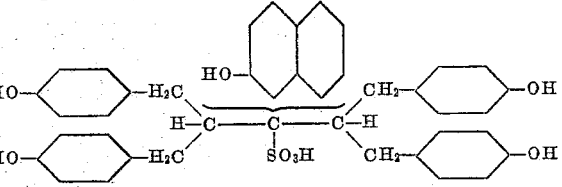

is obtained.

Example 4

65 parts of dihydroxydiphenyl sulfone are added at 80° C. to a precondensate prepared according to Example 3 from acetone-bisulfite solution and an oily cresol-phenol-formaldehyde condensation product and the said temperature is maintained for about 2½ hours after which the whole is heated at 90° C. until a sample withdrawn and diluted with water gives a completely clear solution, which is the case after about 14 hours.

The solution is salted out as in Example 3 with hydrochloric acid and further worked up.

Example 5

44 parts of acetaldehyde are allowed to flow slowly while stirring and cooling into a solution of 104 parts of powdered sodium bisulfite in 170 parts of water. A mixture of 194.4 parts of cresol of high purity, 112.8 parts of phenol, 19.6 parts of 38 percent caustic soda solution and 300 parts of a 30 percent formaldehyde solution is heated while stirring for 1 hour at 70° C. and for 5 hours at 80° C. After 12 hours, the oily condensation product is separated from the supernatant liquid.

The cresol-phenol condensation product is allowed to flow at 50° C. into the acetaldehyde-bisulfite solution and the mixture is heated to 90° C. After from 3 to 4 hours, a condensation product is formed which remains clear even after dilution.

This condensation product is allowed to flow while stirring into a solution, heated to 80° C., of beta-naphthol sulfonic acid which has been prepared as follows:

72 parts of beta-naphthol are introduced while stirring into 62.5 parts of 98 percent sulfuric acid, then the whole is heated to 115° C. during the course of half an hour and kept at this temperature for 2 hours. The sulfonate is cooled to 80° C. and dissolved in 75 parts of water.

After the acetaldehyde-bisulfite condensation product has been allowed to flow into the sulfonic acid solution, it is stirred for 20 minutes. A condensation product is obtained which is clearly soluble, even after strong dilution. It is adjusted with ammonia and glacial acetic acid to a pH value of 3.6 and an acid value of 70. It has good plumping and softening tanning properties.

Instead of the cresol-phenol mixture 285 parts of phenol (3 mols) can also be used, a product of the formula:

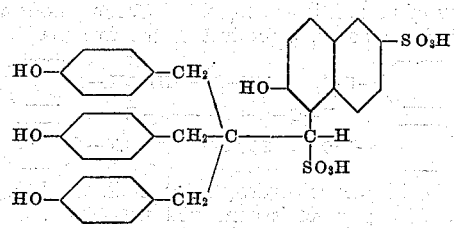

being obtained.

Example 6

A condensation product of the acetaldehyde bisulfite addition compound and the reaction product of a cresol-phenol mixture and formaldehyde is prepared as in Example 5.

This condensation product is allowed to flow at a temperature of 60° C. into a solution of 55 parts resorcinol and 50 parts of water while stirring. The mixture is then stirred for 15 minutes at 60° C. The product is adjusted to a pH value of 3.7 and an acid value of 70. It has similar tannin properties as the condensation product of Example 5.

Example 7

58 parts of acetone are allowed to flow while cooling and stirring into a solution of 99 parts of ammonium bisulfite in 68 parts of water.

A mixture of 388.8 parts of cresol of high purity, 37.6 parts of phenol, 28 parts of 36 percent caustic soda solution and 400 parts of 30 percent formaldehyde solution is heated for 1 hour at 65° C., 3 hours at 75° C. and 2 hours at 80° C. After a further 12 hours, the oily condensation product is separated from the supernatant aqueous solution.

The oily condensation product is allowed to flow at 50° C. into the acetone-ammonium bisulfite solution, the mixture is heated to 90° C. and stirred for 2 hours at 90° to 93° C. until the condensation product remains clear when diluted with water.

A sulfonate is then prepared, as described in Example 5, from 75.01 parts of 98 percent sulfuric acid and 86.4 parts of beta-naphthol. The sulfonate is dissolved in 75 parts of water and the solution stirred for 4 hours in a boiling water bath.

The condensation product prepared as described above is then allowed to flow into the sulfonate solution heated to 80° C. and the whole stirred for 15 minutes at 80° C. The final condensation product is adjusted with ammonia and glacial acetic acid to a pH value of 3.6 and an acid value of 70. It gives a very full and supple leather when used for tanning.

Example 8

Into an acetone-ammonium bisulfite solution prepared as described in Example 7 there is allowed to flow at 50° C. a cresol-phenol-formaldehyde condensation product prepared as follows:

A mixture of 345.6 parts of cresol of high purity, 75.2 parts of phenol, 26 parts of 38 percent caustic soda solution and 400 parts of 30 percent formaldehyde is heated while stirring for 1 hour at 65° C., 3 hours at 75° C. and 2 hours at 80° C.

The mixture of the oily condensation product and the acetone-ammonium bisulfite solution is heated for 2 to 3 hours at 90° C. while stirring until a sample can be diluted with cold water and still remain clear. The condensation product is then allowed to flow at 60° C. while stirring into a solution of 1500 parts of decalcified sulfite cellulose waste liquor having 50 percent total dry residue which has been neutralized with 35 parts by volume of 25 percent ammonia solution, and the whole is stirred for 15 to 20 minutes at 60° C.

The product is adjusted to a pH value of 3.5 and an acid value of 70 with glacial acetic acid and ammonia.

When used for tanning it yields a full leather of high weight and elastic handle.

Example 9

29 parts of acetone are allowed to flow into a solution of 52 parts of powdered sodium bisulfite in 85 parts of water while cooling and stirring.

A mixture of 257 parts of ortho-chlorphenol, 200 parts of 30 percent formaldehyde solution and 14 parts of 36 percent caustic soda solution is heated for 1 hour at 75° C. and for 5 hours at 85° C. After a further 12 hours, the oily condensation product is separated from the aqueous solution and is allowed to flow into the acetone-bisulfite solution at 50° C. while stirring. The mixture is then heated to 90° C. and kept at this temperature for about 10 hours.

The condensation product, which can be diluted with water while remaining a clear solution, is cooled to 60° C. A solution of 27.5 parts of resorcinol in 75 parts of water is allowed to flow in and the whole is stirred for an hour at 60° C.

The product is adjusted with glacial acetic acid to a pH value of 4. It dissolves in water to give a clear solution and, in addition to its tanning properties, has a good bactericidal and preserving action.

Products having a similar action are obtained by carrying out the after-condensation, instead of with the resorcinol solution, with a solution of 34.3 parts of salicylic acid in 75 parts of water.

Example 10

A mixture of 355.5 parts of ortho-chlorphenol, 300 parts of 30 percent formaldehyde solution and 23.9 parts of 31 percent caustic soda solution is heated while stirring for 1 hour at 75° C. and for 5 hours at 85° C. After a further 12 hours, the oily condensation product is separated from the supernatant aqueous liquid and allowed to flow at 50° C. into an acetone-sodium bisulfite solution prepared according to Example 9. The whole is then heated to 90° C. and kept at this temperature for 10 to 12 hours. A solution of 27.5 parts of resorcinol in 150 parts of water is then allowed to flow in at 60° C. and the whole is stirred for about an hour at 60° C. The product is adjusted to a pH value of 4 with glacial acetic acid. It gives a clear solution in hot water even with strong dilution and has a strong bactericidal action.

Example 11

A mixture of 456 parts of para.para$^1$-dihydroxydiphenyldimethylmethane, 400 parts of 30 percent formaldehyde solution, 22.7 parts of 44 percent caustic soda solution and 280 parts of water is heated while stirring for 1 hour at 60° C. and for 5 hours at 70° C. The condensation mixture is then allowed to flow at 50° C. into an acetone-sodium bisulfite solution prepared according to Example 2a and the whole is heated to 90° C. The whole is kept at this temperature for about 3 hours while stirring, until a sample remains clear when diluted with water.

The solution is adjusted to a pH value of 3.6 and an acid value of 70 with ammonia and glacial acetic acid. In tanning, the product yields soft leather of a pure white color which has good stability to light.

Example 12

104 parts of powdered sodium bisulfite are added to a solution of 104 parts of a 2-ketobutane-diol-(1.4) in 200 parts of water and the whole heated at from 50° to 60° C. until dissolution has taken place. Then a cresol-phenol-formaldehyde condensation product prepared according to Example 4 is allowed to flow in and the whole is heated at 90° C. while stirring until the product, after acidification with acetic acid, is soluble in hot water to give a completely clear solution; this is the case after 60 to 90 minutes.

The condensation product is soluble in alcohol and is suitable as a substitute for tannin and for the preparation of color lakes.

Example 13

A product prepared according to Example 12 from 1 mol. of 2-ketobutanediol-(1.4)-sodium bisulfite compound and 6 mols. of cresol-phenol-formaldehyde condensation product is heated, after the addition of 307.2 parts of cresol-phenol mixture (3 mols.), for an hour at 80° C. and then for another hour at 90° C.

A preparation is obtained which is soluble in alcohol and which also dissolved, after dilution with water and slight heating, to give a completely clear solution. It is well suited as a substitute for tannin and as a preserving agent.

Example 14

A mixture of 1247.7 parts of 4-nitro-2.5-dichlorophenol, 1500 parts of water and 390 parts of caustic soda dissolved in 500 parts of water, to which 750 parts of 30 percent formaldehyde solution have been added, is heated for an hour at 70° C. and then for 5 hours at 80° C. The nitrodichlorphenolformaldehyde condensation product is then allowed to flow at 50° C. into a solution of 104 parts of 2-ketobutanediol-(1.4) and 104 parts of powdered sodium bisulfite in 200 parts of water, a solution of 120 parts of caustic soda in 150 parts of water is added, and the whole is heated for 1½ to 2 hours at 90° C. until the condensation product, after dilution with water and acidification with glacial acetic acid, yields a clear solution. The product, after adjustment with glacial acetic acid to a pH value of 6, is very active as a disinfectant.

Example 15

A solution of acetone and sodium bisulfite is prepared according to the teaching of Example 2.

Moreover a mixture of 259.2 parts of cresol of high purity, 150.4 parts of phenol, the solution of 5 parts of caustic soda in 5 parts of water and 400 parts of a 30% formaldehyde solution is heated to 65° C. for 1 hour and to 80° C. for 3 hours while stirring. After cooling to 40° C. 6.8 parts of 85% formic acid are added. The oily condensate is not stripped.

A mixture of the oily condensate and the solution of acetone and sodium bisulfite is heated to 90° C. for about 3 hours while stirring until a sample forms a clear liquid when diluted with cold water. The condensate is then cooled down to 50° C., combined with 10 parts of caustic-soda solution (38% strength) and 120 parts of a mixture of mono- and polyhydric-phenols known as empyreumatic oil, and heated to 80° C. for 2 hours and to 90° C. for 4 hours.

The water-soluble condensate obtained is allowed to run into 3000 parts of sulfite waste liquor decalcified to the extent of 50%, which has previously been treated with 72 parts of beta-naphthol for 1 hour at 50° C. and for 4 hours at 70° C.

The product is adjusted to an acid number of 60 and a pH value of 3.8 with glacial acetic acid. In tanning a light-colored leather of high weight and an elastic handle is obtained.

Example 16

An acetone-sodium bisulfite solution is prepared as described in Example 2. An oily condensation product is also prepared (as described in Example 2a) from a mixture of cresol and phenol, but it is not separated by the addition of formic acid.

The cresol-phenol-formaldehyde condensation product is allowed to flow while stirring into the solution of the sodium bisulfite-acetone addition compound which has been heated to 50° C., the whole is heated to 80° C. and kept at this temperature for 7 to 8 hours.

The condensate is cooled to 50° C. and, after adding 60 parts of urea, it is heated to 60° C. for 1 hour and to 65° C. for 2 hours, a product of the formula

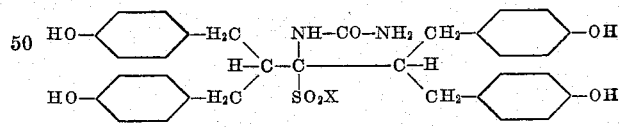

(wherein X means hydrogen or sodium) being obtained. The product is combined with 600 parts of a 50% solution of the condensation product from cresol-sulfonic acid and formaldehyde and the mixture is heated for 1 hour while stirring. The mixture is adjusted to an acid number of 350 and a pH-value of 3.3 to 3.6 by the addition of acetic-acid and can then be used as a pretannin for all vegetable sorts of leather, which lightens the color of the leather to a marked extent, promotes the uptake of the vegetable tans and accelerates penetration of the leather by the vegetable tans considerably.

I claim:
1. A process of manufacturing a water-soluble albumin-precipitating condensation product which comprises condensing by heating at from 60–100° C. in an aqueous medium (a) an addition compound of a water-soluble inorganic salt of sulfurous acid and acetone with approximately equal molar ratios of (b) formaldehyde and phenol, wherein the molar ratio of phenol to said addition compound is in the range of 1:1 to 6:1.
2. A process of manufacturing a water-soluble albumin- precipitating condensation product which comprises condensing by heating at from 60–100° C. in an aqueous medium (a) an addition compound of a water-soluble inorganic salt of sulfurous acid and acetone with approximately equal molar ratios of (b) formaldehyde and cresol, wherein the molar ratio of cresol to said addition compound is in the range of 1:1 to 6:1.

3. A process of manufacturing a water-soluble albumin-precipitating condensation product which comprises condensing by heating at from 60–100° C. in an aqueous medium (a) an addition compound of a water-soluble inorganic salt of sulfurous acid and acetone with approximately equal molar ratios of (b) formaldehyde and a phenol-cresol mixture, wherein the molar ratio of phenolic constituents in said phenol-cresol mixture to said addition compound is in the range of 1:1 to 6:1.

4. A process of manufacturing a water-soluble albumin-precipitating condensation product which comprises condensing by heating at from 60–100° C. in an aqueous medium (a) an addition compound of a water-soluble inorganic salt of sulfurous acid and acetaldehyde with approximately equal molar ratios of (b) formaldehyde and a phenol-cresol mixture, wherein the molar ratio of phenol to said addition compound is in the range of 1:1 to 4:1.

5. A water-soluble albumin-precipitating compound containing on the same aliphatic carbon atom in a short aliphatic chain a hydroxy group and a group selected from the class consisting of $SO_3H$, $-SO_3Na$, and $-SO_3NH_4$, and having at least one hydroxyaryl methyl group, the hydroxy aryl radical thereof being derived from at least one of the members from the group consisting of phenol itself, a polyhydric phenol, an alkyl phenol, a halogenated phenol, a dihydroxydiphenylmethane, a nitrophenol, and a carboxylated phenol on at least one adjacent carbon atom.

6. A water-soluble albumin-precipitating compound having the general formula

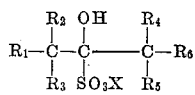

wherein $R_1$ is a hydroxyaryl methyl group, the hydroxyaryl radical thereof being derived from at least one of the members from the group consisting of phenol itself, a polyhydric phenol, an alkyl phenol, a halogenated phenol, a dihydroxydiphenylmethane, a nitrophenol, and a carboxylated phenol and $R_2$, $R_3$, $R_4$, $R_5$ and $R_6$ are members of the groups consisting of hydrogen and a hydroxyaryl methyl group, the hydroxyaryl radical thereof being derived from at least one of the members from the group consisting of phenol itself, a polyhydric phenol, an alkyl phenol, a halogenated phenol, a dihydroxydiphenylmethane, a nitrophenol, and a carboxylated phenol and X is a member of the group consisting of hydrogen, an alkali metal and ammonium.

7. A water-soluble albumin-precipitating compound having the general formula

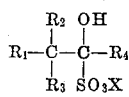

wherein $R_1$ is a hydroxyaryl methyl group, the hydroxyaryl radical thereof being derived from at least one of the members from the group consisting of phenol itself, a polyhydric phenol, an alkyl phenol, a halogenated phenol, a dihydroxydiphenylmethane, a nitrophenol, and a carboxylated phenol and $R_2$, $R_3$ and $R_4$ are members of the group consisting of hydrogen and a hydroxyaryl methyl group, the hydroxyaryl radical thereof being derived from at least one of the members from the group consisting of phenol itself, a polyhydric phenol, an alkyl phenol, a halogenated phenol, a dihydroxydiphenylmethane, a nitrophenol, and a carboxylated phenol and X is a member of the group consisting of hydrogen, an alkali metal and ammonium.

8. A water-soluble albumin-precipitating compound having the formula

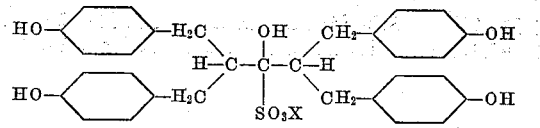

wherein X is a member of the group consisting of hydrogen, an alkali metal and ammonium.

9. A water-soluble albumin-precipitating compound having the formula

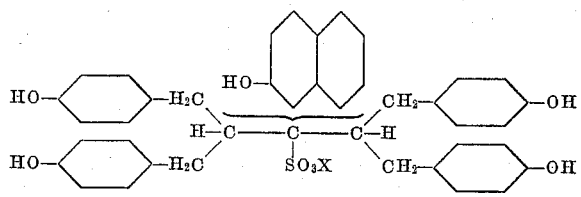

wherein X is a member of the group consisting of hydrogen, an alkali metal and ammonium.

10. A water-soluble albumin-precipitating compound having the formula

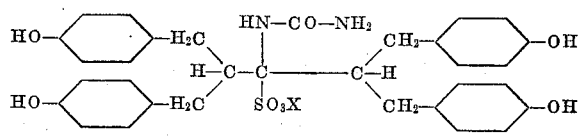

wherein X is a member of the group consisting of hydrogen, an alkali metal and ammonium.

11. A process of manufacturing a water-soluble albumin-precipitating condensation product which comprises condensing by heating at from 60–100° C. in aqueous medium (a) an addition compound of a member selected from the group consisting of sulfurous acid and a water-soluble, inorganic salt of sulfurous acid and a lower molecular weight, saturated, aliphatic carbonyl compound having at least one reactive hydrogen on a carbon atom contiguous to the carbonyl group with (b) approximately equal molar amounts of formaldehyde and a phenolic compound selected from the group consisting of phenol itself, a polyhydric phenol, an alkyl phenol, a halogenated phenol, a dihydroxydiphenylmethane, a nitrophenol and a carboxylated phenol, wherein the molar amount of the phenolic compound is at most equal to the reactive hydrogen atoms on the carbonyl carbon and the carbons contiguous thereto in the said carbonylsulfurous acid addition compound, and then replacing the hydroxy group in the sulfocarbinol group of said carbonyl-sulfurous acid addition compound by heating in aqueous alkaline medium at from 60–100° C. with a member of the class consisting of phenol, a polyhydric phenol, a hydroxyaryl carboxylic acid, naphthols, dihydroxydiphenylsulfone and urea.

12. A process of manufacturing a water-soluble albumin-precipitating condensation product which comprises condensing by heating at from 60–100° C. (a) an addition compound of a member selected from the group consisting of sulfurous acid and a water-soluble, inorganic salt of sulfurous acid and a lower molecular weight, saturated, aliphatic carbonyl compound having at least one reactive hydrogen on a carbon contiguous to the carbonyl group with (b) approximately equal molar ratios of formaldehyde and a phenolic compound of at least one member selected from the group consisting of phenol itself, a polyhydric phenol, an alkyl phenol, a halogenated phenol, a dihydroxydiphenylmethane, a nitrophenol and a carboxylated phenol, wherein the mol. ratio of phenolic compound to addition compound is at least 1:1 and does not exceed $x$:1, wherein $x$ is the total number of reactive hydrogens on the carbonyl carbon and the carbons contiguous thereto.

References Cited in the file of this patent

UNITED STATES PATENTS

| | | |
|---|---|---|
| 1,539,517 | Schmidt | May 26, 1925 |
| 2,099,717 | Alles | Nov. 23, 1937 |
| 2,122,124 | Alles | June 28, 1938 |
| 2,148,893 | Bauer et al. | Feb. 28, 1939 |
| 2,230,564 | Gasnier | Feb. 4, 1941 |

OTHER REFERENCES

Beilstein's Handbuch der Organischen Chemie, Vierte Auflage, vol. 8, p. 95 (1925).

Progress in Leather Science, 1948, pp. 261–263.